(12) United States Patent
Li (10) Patent No.: US 11,107,232 B2
(45) Date of Patent: Aug. 31, 2021

(54) METHOD AND APPARATUS FOR DETERMINING OBJECT POSTURE IN IMAGE, DEVICE, AND STORAGE MEDIUM

(71) Applicant: TENCENT TECHNOLOGY (SHENZHEN) COMPANY LIMITED, Shenzhen (CN)

(72) Inventor: Jia Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 49 days.

(21) Appl. No.: 16/531,434

(22) Filed: Aug. 5, 2019

(65) Prior Publication Data

US 2019/0355147 A1 Nov. 21, 2019

Related U.S. Application Data

(63) Continuation of application No. PCT/CN2018/095191, filed on Jul. 10, 2018.

(30) Foreign Application Priority Data

Jul. 14, 2017 (CN) .......................... 201710573908.5

(51) Int. Cl.
*G06T 7/70* (2017.01)
*G06N 3/08* (2006.01)

(52) U.S. Cl.
CPC ............... *G06T 7/70* (2017.01); *G06N 3/08* (2013.01); *G06T 2207/20021* (2013.01); *G06T 2207/20081* (2013.01); *G06T 2207/20084* (2013.01)

(58) Field of Classification Search
CPC ............. G06T 7/70; G06T 2207/20021; G06T 2207/20081; G06T 2207/20084;

(Continued)

(56) References Cited

U.S. PATENT DOCUMENTS 9,575,566 B2   2/2017   DeBattista et al.
2008/0013836 A1*  1/2008   Nakamura ........... G06K 9/6211
                                                         382/209

(Continued)

FOREIGN PATENT DOCUMENTS

CN     103927534 A     7/2014
CN     104268538 A     1/2015

(Continued)

OTHER PUBLICATIONS

Lei Jimmy Ba, Univ. of Toronto, jimmy@psi.utoronto.ca and Rich Caruana, Microsoft Research, "Do Deep Nets Really Need to be Deep?", pp. 1-9.

(Continued)

*Primary Examiner* — Edward F Urban
*Assistant Examiner* — Wassim Mahrouka
(74) *Attorney, Agent, or Firm* — Oblon, McClelland, Maier & Neustadt, L.L.P.

(57) ABSTRACT

This application discloses a method and an apparatus for determining a posture of a target object in an image, a device, and a non-transitory storage medium. In the method, a training model parameter of a convolutional neural network of the target object is obtained from a server. A real-time image of the target object is obtained. At least one first image block from the real-time image is identified. The at least one first image block is a local image of the real-time image. According to the training model parameter, a label image block matching the at least one first image block is determined. The label image block is a local image of a standard image of the target object. Furthermore, the posture of the target object is determined, by processing circuitry of a terminal device, according to the at least one first image block and the determined label image block.

23 Claims, 7 Drawing Sheets

(58) Field of Classification Search
CPC ........ G06N 3/08; G06N 3/0454; G06F 3/011; G06K 9/4604; G06K 9/4671; G06K 9/6256
See application file for complete search history.

(56) References Cited

U.S. PATENT DOCUMENTS

| | | | | |
|---|---|---|---|---|
| 2014/0185941 | A1* | 7/2014 | Li | G06K 9/4671 382/201 |
| 2016/0170492 | A1 | 6/2016 | DeBattista et al. | |
| 2016/0352818 | A1* | 12/2016 | Han | H04L 67/104 |
| 2018/0350031 | A1* | 12/2018 | Zhang | G06T 3/0093 |
| 2019/0080450 | A1* | 3/2019 | Arar | G06T 7/0012 |

FOREIGN PATENT DOCUMENTS

| | | | |
|---|---|---|---|
| CN | 105512676 | A | 4/2016 |
| CN | 106683091 | A * | 5/2017 |
| CN | 106683091 | A | 5/2017 |
| CN | 107330439 | A | 11/2017 |
| JP | 2017-059207 | A | 3/2017 |
| KR | 10-2015-0108556 | | 9/2015 |
| KR | 20150108556 | A * | 9/2015 |
| WO | WO2016/099729 | A1 | 6/2016 |

OTHER PUBLICATIONS

Michael Calonder, Vincent Lepetit, Christoph Streona, and Pascal Fua, CVLab, EPFL, Lausanne, Switzerland, "BRIEF: Binary Robust Independent Elementary Features", pp. 1-14.

Yoshua Bengio, Department of Computer Science and Operations Research, Universite' de Montre'al, Canada, "Deep Learning of Representations: Looking Forward", Jun. 7, 2013, p. 1-27.

David G. Lowe, Computer Science Department, University of British Columbia, Vancouver, B.C., Canada, "Distinctive Image Featuresfrom Scale-Invariant Keypoints", Jan. 5, 2004, pp. 1-28.

Mustafa Özuysal, Michael Calonder, Vincent Lepetit and Pascal Fua, Ecole Polytechnique Fédérale de Lausanne (EPFL) Computer Vision Laboratory, I&C Faculty CH-1015 Lausanne, Switzerland,"Fast Keypoint Recognition using Random Ferns", pp. 1-31.

Alexandre Alahi, Raphael Ortiz, Pierre Vandergheynst, Ecole Polytechnique Federale de Lausanne (EPFL), Switzerland, "FREAK: Fast Retina Keypoint", pp. 1-8.

Anna Bosch Computer Vision Group University of Girona, Andrew Zisserman, Dept. of Engineering Science University of Oxford, and Xavier Munoz Computer Vision Group University of Girona, "Image Classification using Random Forests and Ferns", pp. 1-8.

Jonathan Long, Evan Shelhamer and Trevor Darrell, UC Berkeley, "Fully Convolutional Networks for Semantic Segmentation", pp. 1-10.

Ethan Rublee, Vincent Rabaud, Kurt Konolige and Gary Bradski, Garage, Menlo Park, California, "ORB: an efficient alternative to SIFT or SURF", pp. 1-8.

Vincent Lepetit, Pascal Lagger, and Pascal Fua, Computer Vision Laboratory, Ecole Polytechnique Federale de Lausanne (EPFL) 1015 Lausanne, Switzerland , "Randomized Trees for Real-Time Keypoint Recognition", pp. 1-7.

Herbert Bay, Tinne Tuytelaars, and Luc Van Gool, ETH Zurich, Katholieke Universiteit Leuven, "SURF: Speeded Up Robust Features", pp. 1-14.

Alex Krizhevsky, University of Toronto, Ilya Sutskever, University of Toronto and Geoffrey E. Hinton University of Toronto, "ImageNet Classification with Deep Convolutional Neural Networks", pp. 1-9.

Yoav Freund and Robert E. Schapire, "Decision-Theoretic Generalization of On-Line Learning and an Application to Boosting", Journal of computer and system sciences 55, 119 139 (1997) article No. SS971504, AT6T Labs, 180 Park Avenue, Florham Park, New Jersey 07932, pp. 1-21.

Corinna Cortes and Vladimir Vapnik , AT&T Bell Labs., Holmdel, NJ 07733, USA Editor: Lorenza Saitta "Support-Vector Networks", Machine Learning, 20, 273-297 (1995) © 1995 Kluwer Academic Publishers, Boston. Manufactured in The Netherlands, pp. 1-25.

Simon A. J. Winder and Matthew Brown, Microsoft Research , 1 Microsoft Way, Redmond, WA 98052, USA, "Learning Local Image Descriptors", pp. 1-8.

Y. LeCun, B. Boser, J. S. Denker, D. Henderson , R. E. Howard, W. Hubbard, L. D. Jackel, AT&, T Bell Laboratories Holmdel, NJ 07733 USA, Communicated by Dana Ballard, "Backpropagation Applied to Handwritten Zip Code Recognition", pp. 1-11.

Yann LeCun, Leon Bottou, Yoshua Bengio, and Patrick Haffner, "Gradient-Based Learning Applied to Document Recognition", Proc. of the IEEE, Nov. 1998, pp. 1-46.

Leo Breiman, Statistics Department, University of California, Berkeley, CA 94720, Editor: Robert E. Schapire, "Random Forests", Machine Learning, 45, 5-32, 2001, @ 2001 Kluwer Academic Publishers. Manufactured in The Netherlands. pp. 1-28.

Alexander Waibel, Member, IEEE, Toshiyuki Hanazawa, Geoffrey Hinton, Kiyohiro Shikano, Member, IEEE, and Kevin J. Lang, "Phoneme Recognition Using Time-Delay Neural Networks", IEEE Transactions on Acoustics, Speech, and Signal Processing, vol. 31. No. 3. Mar. 1989, pp. 328-338.

Vladimir N. Vapnik, "The Nature of Statistical Learning Theory", Second Edition, Statistics for Engineering and Information Science, pp. 1-334.

International Search Report Issued in Application PCT/CN2018/095191 dated Sep. 27, 2018, with English Machine translation (12 pages).

Written Opinion Issued in Application International Search Report Issued in Application PCT/CN2018/095191 dated Sep. 27, 2018, with English Machine Translation (8 pages).

Japanese Office Action Issued in Japanese Patent Application No. 2019-541339 dated Jun. 30, 2020, with English Translation (4 pages).

European Search Report Issued in Application EP18832199.6-1207, Patent No. 3576017, PCT/CN2018/095191 dated Dec. 1, 2020, (8 pages).

* cited by examiner

METHOD AND APPARATUS FOR DETERMINING OBJECT POSTURE IN IMAGE, DEVICE, AND STORAGE MEDIUM

RELATED APPLICATION

This application is a continuation of International Application No. PCT/CN2018/095191, filed on Jul. 10, 2018, which claims priority to Chinese Patent Application No. 201710573908.5, entitled "METHOD FOR DETERMINING OBJECT POSTURE IN IMAGE, CLIENT, AND SERVER" filed with the National Intellectual Property Administration, PRC on Jul. 14, 2017. The entire disclosures of the prior applications are hereby incorporated by reference in their entirety.

FIELD OF THE TECHNOLOGY

The embodiments of this application relate to the field of image processing.

BACKGROUND OF THE DISCLOSURE

With the rapid development of computer graphics technologies, the augmented reality technology organically integrates virtual information such as graphics and text generated by computers into real scenes seen by users, to augment or expand the scenes of human visual systems. The basis of implementing the augmented reality technology is that the observation angle of a real scene can be obtained. For example, when an image of a real scene is obtained by using a camera, a posture of a three-dimensional object needs to be estimated through a two-dimensional observed image, so as to add virtual content to a real scene through a posture of the three-dimensional object and display the virtual content.

In the related art, a commonly used method is to first detect artificially designed features and then compare the features among different images. However, such method may require additional steps such as accurate scale selection, rotation correction, and density normalization, and may have high calculation complexity and consume long time. Therefore, this method is not applicable to a terminal device such as a mobile device or a wearable device because the terminal device generally has limited resources, and limited information input and calculating capabilities.

SUMMARY

In view of this, the embodiments of this application provide a method and an apparatus for determining an object posture in an image, a device, and a storage medium. The present disclosure improves the time efficiency of image processing and consumes a relatively small quantity of memory resources, thereby improving the resource utilization rate of a terminal device.

According to an embodiment of the present disclosure, a method for determining a posture of a target object is provided. In the method, a training model parameter of a convolutional neural network of the target object is obtained from a server. A real-time image of the target object is obtained. At least one first image block from the real-time image is identified. The at least one first image block is a local image of the real-time image. According to the training model parameter, a label image block matching the at least one first image block is determined. The label image block is a local image of a standard image of the target object. Furthermore, the posture of the target object is determined, by processing circuitry of a terminal device, according to the at least one first image block and the determined label image block.

According to an embodiment of the present disclosure, another method for determining a posture of a target object is provided. In the method, a standard image of the target object, and a plurality of distorted images of the target object are obtained. The standard image and the plurality of distorted images are inputted into a convolutional neural network for training to obtain a training model parameter of the convolutional neural network. By processing circuitry of a server, the training model parameter is sent to a terminal device, which causes the terminal device to obtain a real-time image of the target object, identify at least one first image block from the real-time image, the first image block being a local image of the real-time image, determine, according to the training model parameter, a label image block matching the at least one first image block, the label image block being a local image of the standard image of the target object, and determine the posture of the target object according to the at least one first image block and the label image block.

According to an embodiment of the present disclosure, an apparatus for determining a posture of a target object in an image is provided. The apparatus includes processing circuitry. The processing circuitry is configured to obtain a training model parameter of a convolutional neural network of the target object from a server. The processing circuitry is configured to obtain a real-time image of the target object. The processing circuitry is configured to identify at least one first image block from the real-time image. The first image block is a local image of the real-time image. The processing circuitry is configured to determine, according to the training model parameter, a label image block matching the at least one first image block. The label image block is a local image of a standard image of the target object. The processing circuitry is further configured to determine the posture of the target object according to at least one first image block and the determined label image block.

According to an embodiment of the present disclosure, another apparatus for determining a posture of a target object in an image is provided. The other apparatus includes processing circuitry. The processing circuitry is configured to obtain a standard image of the target object, and a plurality of distorted images of the target object. The processing circuitry is configured to input the standard image and the plurality of distorted images into a convolutional neural network for training to obtain a training model parameter of the convolutional neural network. The processing circuitry is configured to send the training model parameter to a terminal device, which causes the terminal device to obtain a real-time image of the target object, identify at least one first image block from the real-time image, the first image block being a local image of the real-time image, determine, according to the training model parameter, a label image block matching the at least one first image block, the label image block being a local image of the standard image of the target object, and determine the posture of the target object according to the at least one first image block and the label image block.

According to an embodiment of the present disclosure, a terminal device is provided. The terminal device includes a processor and a memory. The memory stores at least one instruction, and the instruction is loaded and executed by the processor to implement the method for determining a posture of a target object in an image stated above.

According to an embodiment of the present disclosure, a server is provided. The server includes a processor and a memory. The memory stores at least one instruction, and the instruction is loaded and executed by the processor to implement the method for determining a posture of a target object in an image stated above.

According to an embodiment of the present disclosure, a computer-readable storage medium storing a computer executable instruction is provided. The computer executable instruction is used to perform the forgoing methods for determining a posture of target object. In view of the foregoing technical solutions and according to the method provided in the embodiments of this application, offline training is performed by using the convolutional neural network, and then during online determination of the object posture, a trained training model parameter is used, so that calculation complexity of image processing is greatly reduced, the time efficiency is improved, and the number of occupied memory resources is reduced; In addition, the accuracy of the determining method can also be ensured. The method is particularly applicable to application of augmented reality services on a resource limited device, thereby improving the resource utilization rate of the terminal device.

BRIEF DESCRIPTION OF THE DRAWINGS

To describe the technical solutions of the embodiments of the present disclosure more clearly, the following briefly introduces the accompanying drawings required for describing the embodiments. The accompanying drawings in the following description show merely some embodiments of the present disclosure, and a person of ordinary skill in the technology may still derive other drawings from these accompanying drawings.

DESCRIPTION OF EMBODIMENTS

To make the objectives, technical solutions, and advantages of this application clearer and more comprehensible, the following further describes this application in detail with reference to the accompanying drawings and embodiments.

Figure 1:
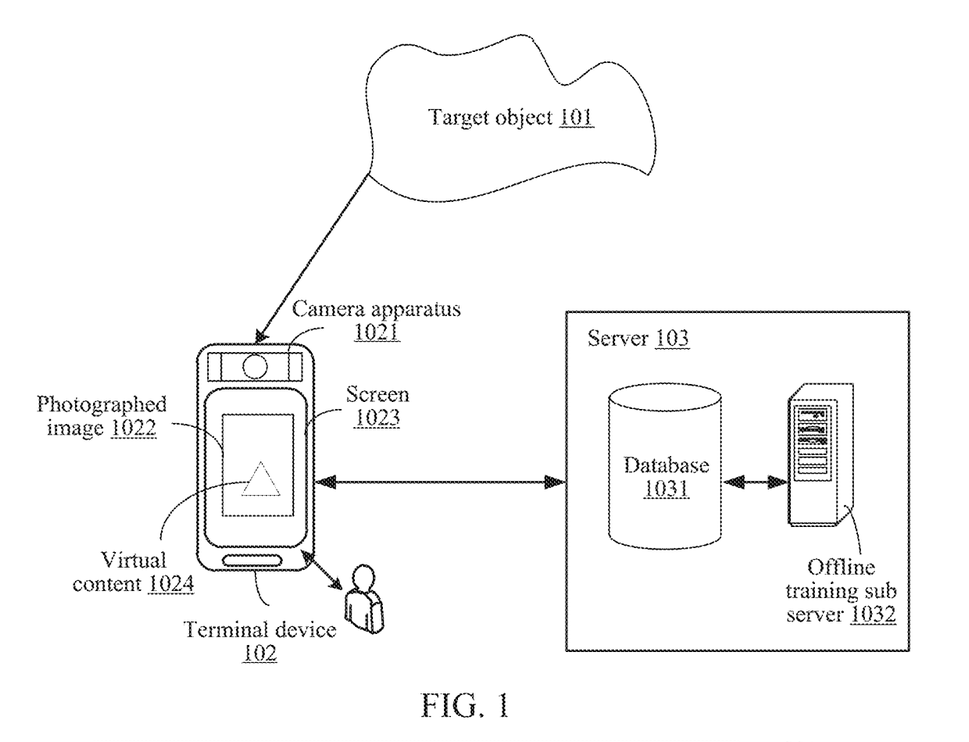
FIG. 1 is a schematic diagram of an implementation environment according to an embodiment of this application.

FIG. 1 is a schematic diagram of an implementation environment of augmented reality according to an embodiment of this application. As shown in FIG. 1, an augmented reality application system 100 includes a target object 101, a terminal device 102, and a server 103. An imaging apparatus (e.g., a camera) 1021, a screen 1023, and an object posture determining client provided in some embodiments of this application are installed in the terminal device 102. The object posture determining client runs an application program of augmented reality.

For example, an image 1022 is photographed/captured by a user using the imaging apparatus 1021. The image 1022 may include the target object 101 and is displayed on the screen 1023. According to the method of an embodiment of this application, a posture of the target object 101 can be estimated from the photographed image 1022, and a location of the target object 101 in the photographed image 1022 can be determined based on the posture, and virtual content 1024 can be added to the same location according to the posture, so that real world and virtual information are superposed in the same image.

According to an embodiment of this application, before the real-time image is detected online at the terminal device, the terminal device 102 first obtains an offline training result of the target object 101 from the server 103. A database 1031 in the server 103 stores a large number of image samples of the target object 101, and then an offline training sub server 1032 performs offline training on the image samples by using the convolutional neural network. After completing the training, the offline training sub server 1032 determines a training model parameter, and then sends the training model parameter to the terminal device 102 for online detection on the real-time image.

Herein, the terminal device 102 is capable of capturing and processing images. For example, the terminal device 102 includes but is not limited to a smartphone, a palmtop computer, a tablet computer, and the like. Operating systems are installed on the terminal device 102, including but not limited to: the Android operating system, the Symbian operating system, the Windows mobile operating system, the iPhone OS operating system, and the like. The terminal device 102 may communicate with the server 103 via a wireless network.

Figure 2:
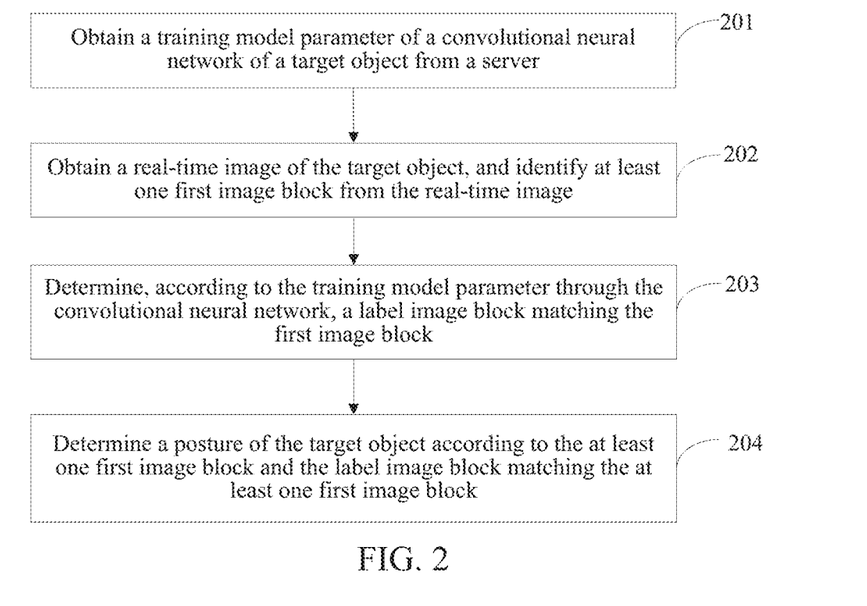
FIG. 2 is a schematic flowchart of a method for determining an object posture in an image according to an embodiment of this application.

FIG. 2 is a schematic flowchart of a method for determining an object posture in an image according to an embodiment of this application. The method may be applied to a separate client, or to a client having an augmented reality function. The client may be installed on the terminal device 102 in the embodiment of FIG. 1. The method includes but is not limited to the following steps.

In Step 201, obtain a training model parameter of a convolutional neural network of a target object from a server.

For example, the server obtains a standard image and a plurality of distorted images of the target object in a scene, and inputs the standard image and the plurality of distorted images into the convolutional neural network for training to obtain the training model parameter. Then, the server sends the training model parameter to a client. The client may be installed on a terminal device and the terminal device receives the training model parameter through the client.

In this embodiment of this application, the trained training model parameter is related to a specific scene, and aims at a single target object. The standard image refers to a clear image photographed captured for the target object in the specific scene, and the distorted images are obtained through perspective distortion based on the standard image.

Figure 3A:
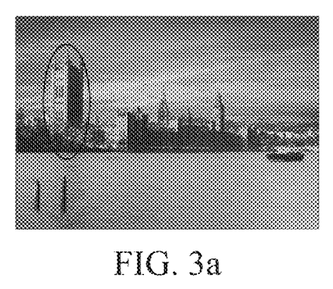
FIG. 3a is a schematic diagram of a standard image of a target object according to an embodiment of this application.
Figure 3B:
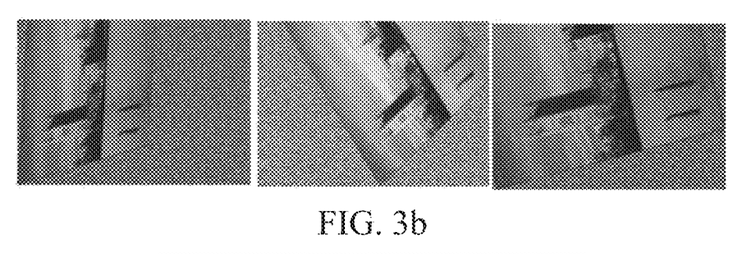
FIG. 3b is a schematic diagram of a distorted object of a target object according to an embodiment of this application.

FIG. 3a provides a standard image for a target object in a city scene, and FIG. 3b provides three corresponding distorted images. The scene is a city building group by a river. The target object is a highest building therein, as shown by an ellipse in FIG. 3a. The three distorted images are obtained by performing rotation and translation on the standard image in FIG. 3a. The target object (i.e., the highest building) can be seen in each distorted image, and some random numbers are filled in the background.

Figure 4A:
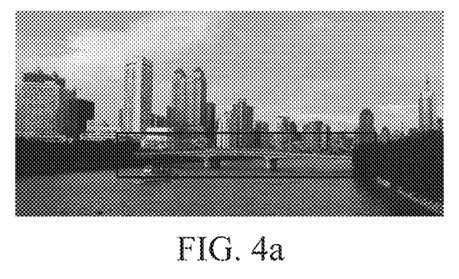
FIG. 4a is a schematic diagram of a standard image of a target object according to another embodiment of this application.
Figure 4B:
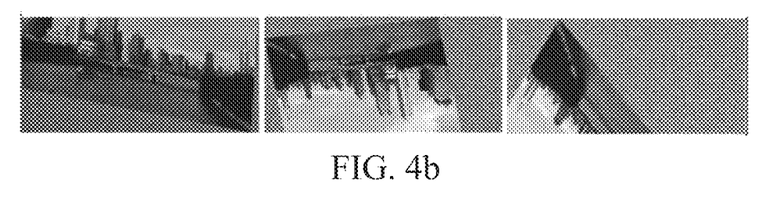
FIG. 4b is a schematic diagram of a distorted object of a target object according to another embodiment of this application.

FIG. 4a and FIG. 4b respectively provide a standard image and three distorted images for a target object in another scene. The target object is a bridge over a river, as shown by a block in FIG. 4a. The three distorted images are also obtained by performing rotation and translation on the standard image, and a complete or partial target object (i.e., the bridge) can be seen in each distorted image.

Step 201 may be performed before a user uses an augmented reality service, and an obtained training model parameter is pre-stored in the client. When using the augmented reality service, the user reads the training model parameter for determining the posture of the target object.

In Step 202, obtain a real-time image of the target object, and identify at least one first image block from the real-time image.

In this step, the user may be located in the scene, and expects to use the augmented reality service. First, the user photographs/captures the real-time image of the target object by using the imaging apparatus of the terminal device on which the client is installed, and transmits the real-time image to the client. Then, the client identifies at least one first image block from the real-time image. The first image block is part of the real-time image (e.g., a local image). The identification method includes but is not limited to the following steps:

In a first step, detect features on the real-time image and obtain a plurality of local features.

A local feature refers to an area that is different from the periphery of the local feature in an image. In other words, the local feature is highly distinguishable from other areas of the image.

In a second step, for each local feature of the plurality of local features, if it is determined that (i) an image contrast ratio of the local feature is greater than a preset contrast ratio threshold and (ii) the local feature is not an edge of the image, determine the local feature as the first image block.

For example, the contrast ratio refers to measurement of different brightness levels between brightest white and darkest black in bright and dark regions in an image, namely, the size of grayscale contrast in an image. In this way, the identified first image block can stand out from the surrounding environment, so that ambiguity in location can be reduced. For example, when the real-time image is a facial image, the first image block may be a nose tip, an eye corner, and the like of the face.

In an embodiment of the present disclosure, methods such as scale invariant feature transform (SIFT), a speeded up robust feature (SURF) identification algorithm, and speeded up sectionalization test feature identification (FAST) may be used. The methods have different detection accuracies and speeds. In an actual application, a compromise may be made between processing complexity and time efficiency according to hardware capabilities of the terminal device.

In an embodiment of the present disclosure, the local feature may also be determined according to a single determining result. For example, if it is determined that the image contrast ratio of the local feature is greater than a preset contrast ratio threshold, the local feature is determined as a first image block. Alternatively, if the local feature is not an edge of the image, the local feature is determined as the first image block. Herein, the identification accuracy of the local feature will affect subsequent matching and the determined posture.

In Step 203, determine, based on the training model parameter and the convolutional neural network, a label image block matching the first image block.

The terminal device inputs each first image block into the convolutional neural network. The convolutional neural network outputs a label image block matching each first image block based on the training model parameter. The label image block is the local image of the standard image matching the first image block.

In an embodiment of the present disclosure, the training model parameter includes a weight and a second image block. The second image block is identified from the standard image and is a local image of the standard image. The convolutional neural network includes a plurality of convolutional layers. The weight refers to each element value in a convolution matrix used by each convolutional layer.

In this step, the matching method includes but is not limited to the following steps:

In a first step, input the first image block into the convolutional neural network, and output, based on the weight, a probability that the first image block matches each second image block.

The convolutional neural network can classify the first image block into different types. Each second image block represents a label of the type. The first image block is processed in the convolutional neural network through a weight. An output result is a probability that the first image block matches each second image block. A value of the probability represents a similarity between the first image block and the second image block.

In a second step, determine a second image block having a largest probability value as the label image block.

For example, an identifier of the target object is preset on the client and the server. The training model parameter includes the identifier. Then, after receiving the training model parameter, the client receives the identifier. When Step 202 is performed, a target object corresponding to the real-time image is determined according to the obtained real-time image or current positioning information of the terminal. Then, the training model parameter used for matching when Step 203 is performed can be obtained according to the identifier of the target object.

In Step 204, determine a posture of the target object according to each first image block and the label image block, the label image block matching each first image block.

In an example, a posture of the target object is indicated by affine transformation. To be specific, each label image block matches the first image block through affine transformation. The affine transformation may be indicated by a form of an affine transformation matrix. A corresponding affine transformation matrix between each first image block and a label image block matching the first image block constitutes an affine transformation cluster. If the first image block is $q_i$, i=1, . . . N, N is the total number of first image blocks, a label image block match $q_i$ is $p_i$, and the affine transformation is indicated by a matrix A, then:

$$q_i = A p_i \quad (1)$$

The affine transformation can reflect the amount of translation and rotation of the target object relative to a camera lens, and can describe an imaging process of the target object from a 3D space to a 2D planar image. The affine transformation may be linear transformation, and may have general characteristics of transforming parallel lines into parallel lines, and mapping finite points onto finite points. Affine transformation in a two-dimensional Euclidean space may be indicated as:

$$\begin{pmatrix} x' \\ y' \end{pmatrix} = \begin{pmatrix} a_1 & a_2 \\ a_3 & a_4 \end{pmatrix} \begin{pmatrix} x \\ y \end{pmatrix} + \begin{pmatrix} a_0 \\ a_5 \end{pmatrix} \quad (2)$$

(x, y) and (x', y') respectively refer to coordinates of two points (namely, pixels) in a standard image and a real-time image;

$$\begin{pmatrix} a_1 & a_2 \\ a_3 & a_4 \end{pmatrix}$$

is a matrix indication of synthetic transformation of rotation, scaling and shearing; $(a_0, a_5)^T$ is a translation vector; and $a_i$, is a real number. A vector $a=(a_0, a_1, a_2, a_3, a_4, a_5)^T$ formed by six parameters represents affine transformation, and determines a coordinate conversion relationship between two points, including three-dimensional rotation and translation.

Therefore, affine transformation may have six degrees of freedom, and a posture estimated according to the above-described affine transformation is also usually referred to as a 6D posture. According to specific values of parameters in a vector, translation, rotation, zooming, reflection, shearing, and the like are all part of affine transformation.

When the posture of the target object is determined, a matrix estimated value of the affine transformation matrix set may be determined from the affine transformation matrix set according to a least squares principle. The matrix estimated value is an argument of inverse transformation corresponding to the affine transformation matrix set. For example, the matrix estimated value $\hat{A}$ may be calculated by using the following formula:

$$\hat{A} = \underset{A \in G}{\arg\min} \sum_{i=1}^{N} \| q_i - A p_i \| \quad (3)$$

$\|\cdot\|$ represents a square of a modulus value of •, and G is the affine transformation matrix set.

After the posture indicated by $\hat{A}$ is determined, any virtual content expected to be added to the real-time image may be transformed using $\hat{A}$, to keep an observation angle consistent with the real-time image, thereby adding the virtual content to the real-time image, and displaying a mixed image affect (i.e., augmented reality effect) for a user.

In this embodiment, the training model parameter of the trained convolutional neural network is received from the server, the real-time image obtained by photographing the target object by a user is received, at least one first image block is identified in the real-time image, and the image block is used as an input of the convolutional neural network. The advantage is that compared with the entire image, the transformation-resistant capability of the small image block is strong, especially for translation transformation. Furthermore, segmentation or any other image semantic interpretation in advance is not needed.

In addition, for each first image block, the label image block matching the first image block is determined according to the training model parameter, the posture of the target object is determined according to each first image block and the label image block matching each first image block, and the virtual content is added to the real-time image according to the posture. The advantage of determining the posture by using the convolutional neural network is that, the weight data in this network may be shared in a plurality of connections, so that the calculation complexity of the foregoing method is low, the time efficiency is high, and the number of occupied memory resources is small. Therefore, the method is particularly applicable to application of augmented reality services on a resource limited device, such as a mobile terminal or a wearable device with limited battery capabilities.

Figure 5:
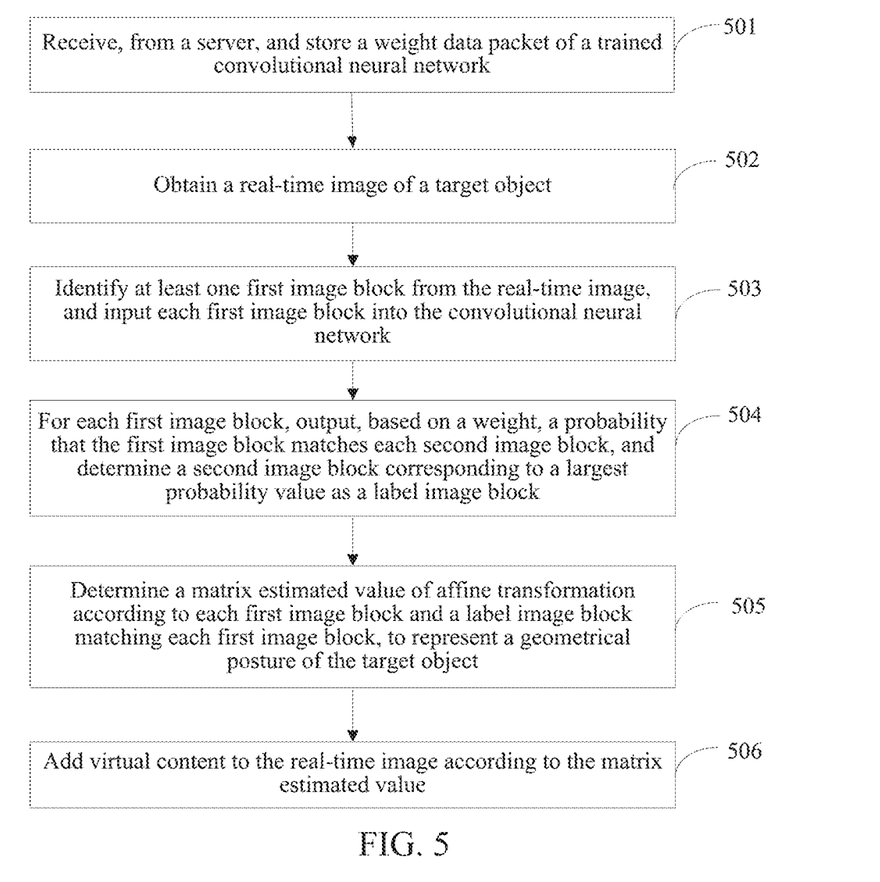
FIG. 5 is a schematic flowchart of a method for determining an object posture in an image according to another embodiment of this application.

FIG. 5 is a schematic flowchart of a method for determining an object posture in an image according to another embodiment of this application. As shown in FIG. 5, the method includes but is not limited to the following steps:

In Step 501, receive, from a server, a training model parameter of a trained convolutional neural network and store the received training model parameter.

The server performs offline training on a target object in a specific scene, and sends the training model parameter to a client for storage after the offline training. During real-time monitoring, the client invokes/uses the training model parameter.

In Step 502, obtain a real-time image of a target object.

For example, the real-time image may be a static picture photographed by a user or one frame of image in a video. When a video stream is received, one frame of image is extracted from the video stream every other fixed interval as a to-be-processed real-time image. For example, the video stream includes 24 frames of images per second, and one frame of image may be extracted every other second.

In Step 503, identify at least one first image block from the real-time image, and input the at least one first image block into the convolutional neural network.

In Step 504, for each first image block, output, based on a weight, a probability that the first image block matches each second image block, and determine a second image block corresponding to a largest probability value as a label image block.

The details of this step are described in the foregoing Steps 202 and 203, and are not described herein.

In Step 505, determine a matrix estimated value of affine transformation according to each first image block and a label image block matching each first image block, to represent a geometrical posture of the target object.

In this step, the first image block and the label image block matching the first image block constitute a matching pair, namely, ($q_i$, $p_i$). Before the posture is determined, trade-off or selection of the matching pair may be further included. For each first image block, this step includes but is not limited to the following steps:

In a first step, input the first image block into the convolutional neural network, and output, based on the weight, a probability that the first image block matches each second image block.

For example, if the total number of second image blocks is M, an output layer of the convolutional neural network outputs a 1×M dimensional class vector, values of elements in the vector are [0, 1], representing the foregoing probability.

In a second step, if a total number of second image blocks whose probability is greater than a preset probability threshold is greater than a preset number, use the first image block and the label image block matching the first image block for determining the posture of the target object.

For example, the preset probability threshold may be 0.6, and the preset number threshold may be 200. If the number of elements whose value is greater than 0.6 is greater than 200, the matching pair is kept for determining the posture. The matching pair selected in this way can adapt to most postures.

A first image block whose total number is greater than a preset number threshold is referred to as a target image block. The terminal device determines the posture of the target object according to the target image block and the label image block corresponding to the target image block.

For example, an incorrect matching pair may also be filtered by using random sample consensus.

In Step 506, add virtual content to the real-time image according to the a estimated value.

After the matrix estimated value of affine transformation is determined through the standard image, a reverse process may be executed. The virtual content is transformed into a reference system of the real-time image through affine transformation, so that both can be superposed together and the function of augmented reality can be implemented.

In the foregoing embodiment, through trade-off for the matching pair (the first image block and the label image block) and according to the formula (3), the effect value of N can be reduced, and therefore, the calculation complexity is reduced, and the accuracy of the determination of the posture can also be improved. In addition, the geometrical posture of the target object is represented through the matrix estimated value of affine transformation. The use of the matrix estimated value of affine transformation reduces the time for the processing and calculation, thereby improving the time efficiency of the algorithm.

Figure 6:
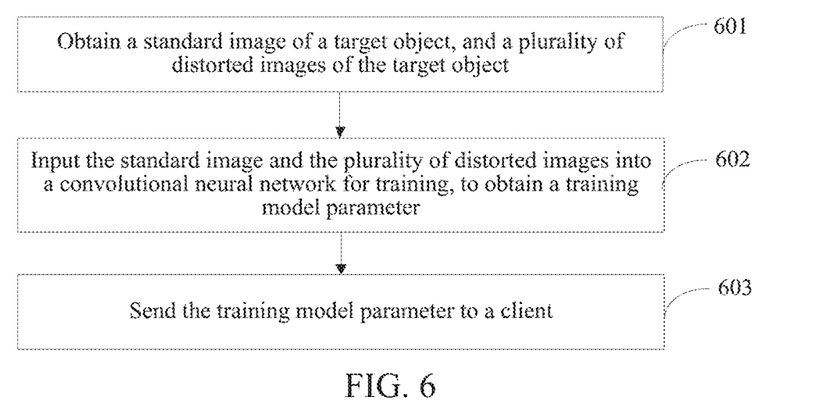
FIG. 6 is a schematic flowchart of a method for determining an object posture in an image according to an embodiment of this application.

FIG. 6 is a schematic flowchart of a method for determining an object posture in an image according to an embodiment of this application. The method may be applied to the server 103 in FIG. 1. The method includes hut is not limited to the following steps.

In Step 601, obtain a standard image of a target object, and a plurality of distorted images of the target object.

When offline training is executed on the server, a large number of training samples need to be obtained first. The standard image is necessary for determining a plurality of label image blocks used during classification. There may be a plurality of manners of obtaining distorted images. For example, a camera may be used to randomly photograph the same target object to obtain a plurality of distorted images, or distortion may be performed on the standard image to obtain a plurality of distorted images. For the latter, in an embodiment, image distortion may also be introduced through affine transformation. The method for obtaining distorted images according to the standard image includes but is not limited to the following steps:

In Step 6011, randomly generate a plurality of affine transformation matrices.

The matrix $A \in \mathfrak{R}^{3\times 2}$ is defined to indicate affine transformation, and a plurality of affine transformation matrices are generated randomly according to the following formula:

$$A = \begin{pmatrix} 1 & 0 \\ 0 & 1 \\ t_x & t_y \end{pmatrix} \begin{pmatrix} \lambda_1 & 0 \\ 0 & \lambda_2 \end{pmatrix} \begin{pmatrix} \cos\varphi & \sin\varphi \\ -\sin\varphi & \cos\varphi \end{pmatrix}^2 \begin{pmatrix} \cos\theta & -\sin\theta \\ \sin\theta & \cos\theta \end{pmatrix} + \begin{pmatrix} 0 & 0 \\ 0 & 0 \\ f_x & f_y \end{pmatrix} \quad (4)$$

Parameters $\varphi$ and $\theta$ are uniformly generated from $(-\pi, \pi]$; parameters $t_x$ and $f_x$ are uniformly generated from [0, w]; w is the width of the standard image; parameters $t_y$ and $f_y$ are uniformly generated from [0, h]; h is the height of the standard image; and parameters $\lambda_1$ and $\lambda_2$ are uniformly generated from [0.5, 1.5].

In Step 6012, for each affine transformation matrix, use the affine transformation matrix to perform affine transformation on the standard image, to obtain a distorted image.

An expression for executing transformation is as follows:

$$I' = A(I) + N \quad (5)$$

I is the input standard image; I' is the generated distorted image; N is white Gaussian noise, the average value is $\mu$, the variance is $\sigma$, and the following relationships are met:

$$f(\mu) = 1/5, \text{ when } 0 \le \mu \le 5 \quad (6)$$

$$\sigma = 0.3 \times (\mu/2 - 1) + 0.8 \quad (7)$$

In Step 602, input the standard image and the plurality of distorted images into a convolutional neural network for training, to obtain a training model parameter.

In Step 603, send the training model parameter to a client.

In this way, the terminal device receives, through the client, the real-time image obtained by photographing the target object by the user, and identifies at least one first image block from the real-time image. For each first image block, the terminal device determines the label image block matching the first image block according to the training model parameter, and determines the posture of the target object according to each first image block and the label image block matching each first image block, and adds the virtual content to the real-time image according to the posture.

In Step 602, the server constructs the convolutional neural network, and then performs training. The convolutional neural network performs feature extraction through a convolution operation, and then performs feature mapping. Each calculation layer of the convolutional neural network consists of a plurality of feature mappings, and each feature mapping is a plane. Weights of all nerve cells on the plane are equal, so that the number of network free parameters can be reduced.

Figure 7:
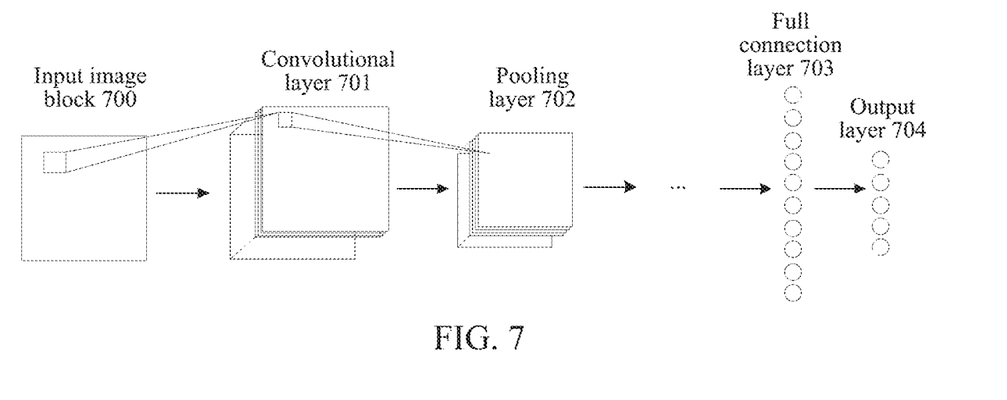
FIG. 7 is a schematic structural diagram of a convolutional neural network according to an embodiment of this application.

FIG. 7 is a schematic structural diagram of a convolutional neural network in an embodiment of this application. As shown in FIG. 7, the convolutional neural network includes a plurality of layers of processing. For example, the convolutional neural network includes at least a convolutional layer 701, a pooling layer 702, a fully connection layer 703, and an output layer.

In the convolutional layer 701, a convolution matrix is used as a filter. When the filter convolves an input image block 700, the weight inside the filter and the corresponding pixel in the image block are multiplied, and all results are added, to obtain an added value. This process is then repeated, and each region of the image block is convolved from left to right and from top to bottom. A value can be obtained in each step, and the final matrix is the feature image.

The pooling layer 702 is usually used after the convolutional layer, and its role is to simplify the output information in the convolutional layer, reduce the data dimensions, reduce the calculation overheads, and control overfitting.

For example, a convolved feature image has a "static" attribute, which indicates that features that are useful in one image region are most likely to be equally applicable in another image region. Therefore, to describe a large image, features at different locations are aggregated for statistics collection, that is, the pooling process. For example, the average or maximum value of a particular feature in a region of an image is calculated. These statistical features not only have a much lower dimension than using all of the extracted features, but also improve the results and are not easily over-fitting.

The full connection layer 703 detects a category more similar to the obtained feature images. The category herein is the various possible labels represented by the M second image blocks.

The output layer 704 outputs a class vector of 1×M dimensions and values of elements in the vector are [0, 1]. Each output dimension refers to a probability that the image block belongs to the category.

In an actual application, multi-layer convolution may be used, followed by training using a full connection layer. That is, in FIG. 7, the convolutional layer 701 and the pooling layer 702 are used as a combination, and a plurality of such combinations are sequentially executed. This network is referred to as a convolutional neural network. The objective of multi-layer convolution is to take into account that the features learned by one layer of convolution are usually local, and a larger number of layers indicates higher globalization of learned features.

When the convolutional neural network includes a plurality of convolutional layers, a method for determining the number of convolutional layers includes but is not limited to the following steps: presetting a correspondence between the number of image blocks and the number of convolutional layers; identifying at least one second image block from the standard image; and determining the number of convolutional layers in the convolutional neural network according to the number of second image blocks and the correspondence.

For example, in the embodiment provided in Table 1, the total number of second image blocks is 400, and the entire network includes 13 layers, There are four convolutional layers, namely, the first, fourth, seventh, and tenth layers. After the first convolutional layer, a maximum pooling layer and a rectified linear unit (ReLU) excitation layer are followed closely; after the fourth convolutional layer, an ReLU excitation layer and an average pooling layer are followed closely; after the seventh convolutional layer, an ReLU excitation layer and an average pooling layer are followed closely; after the tenth convolutional layer, an ReLU excitation layer is followed closely, and finally followed a full connection layer and a soft-max output layer.

TABLE 1

Structure of Deep Convolutional Neural Network

| Number of layers | Type | Input matrix | Output matrix |
| --- | --- | --- | --- |
| 1 | Convolution | 27 × 27 | 32 × 27 × 27 |
| 2 | Maximum pooling | 32 × 27 × 27 | 32 × 14 × 14 |

TABLE 1-continued

Structure of Deep Convolutional Neural Network

| Number of layers | Type | Input matrix | Output matrix |
| --- | --- | --- | --- |
| 3 | ReLU | 32 × 14 × 14 | 32 × 14 × 14 |
| 4 | Convolution | 32 × 14 × 14 | 32 × 14 × 14 |
| 5 | ReLU | 32 × 14 × 14 | 32 × 14 × 14 |
| 6 | Average pooling | 32 × 14 × 14 | 32 × 7 × 7 |
| 7 | Convolution | 32 × 7 × 7 | 64 × 7 × 7 |
| 8 | ReLU | 64 × 7 × 7 | 64 × 7 × 7 |
| 9 | Average pooling | 64 × 7 × 7 | 64 × 4 × 4 |
| 10 | Convolution | 64 × 4 × 4 | 64 × 1 × 1 |
| 11 | ReLU | 64 × 1 × 1 | 64 × 1 × 1 |
| 12 | Full connection | 64 × 1 × 1 | 1 × 400 |
| 13 | Soft-max output | 1 × 400 | 1 × 400 |

An excitation function is called/invoked in the excitation layer to add a nonlinear factor to solve the problem of linear indivisibility. As shown in Table 1, the selected excitation function is referred to as ReLU, and its expression is:

$$f(x)=\max(0,x) \qquad (8)$$

That is, the values less than zero are set to 0, so that the convolutional neural network training speed is faster, and the number of occurrence of gradient disappearance is reduced.

In addition, the convolutional neural network also needs to determine the input sample and the ideal output sample during the training process, and then iteratively adjust the weight. In an embodiment, at least one second image block is identified from the standard image; each distorted image is separately identified, to obtain at least one third image block. Training is performed to obtain the weight by using the third image block as an input sample and using the second image block as an ideal output sample during training of the convolutional neural network.

During training of the convolutional neural network, the weight may be adjusted by using a back propagation algorithm. The back propagation algorithm may be divided into four different parts: forward transmission, loss function, reverse transmission, and updated weight.

In the forward propagation process, an image block is input and transmitted through a convolutional neural network. Initially, all weights are randomly initialized, such as random values [0.3, 0.1, 0.4, 0.2, 0.3 . . . ]. Because the convolutional neural network cannot extract accurate feature images through the initialized weight, any reasonable conclusion about the category to which the picture belongs cannot be provided. In this case, the loss function in back propagation is used to help the convolutional neural network to update the weight, to find the desired feature image. One of the ways to define the loss function is mean squared error (MSE). At the beginning of training of the convolutional neural network, because the weight is randomly initialized, the loss value calculated by the loss function may be high. The objective of training is to expect the predicted value to be the same as the true value. Therefore, the loss value needs to be reduced to the greatest extent. A smaller loss value includes a better prediction result. In this process, the weight will be constantly adjusted to determine which weight(s) can reduce the loss of the network. For example, a gradient descent algorithm may be used to adjust the weight.

Forward transmission, loss function, reverse transmission, and parameter update processes may be completed many times during each training. After the training is completed, one or more trained weights are obtained.

Table 2 provides values of accuracy and occupied memory of two methods. The first method is the method for determining an object posture provided in the foregoing embodiments of this application and the second method is the method for determining a posture using random ferns in the related art.

First, the experimental data is set as follows: in the method provided in the embodiments of this application, the convolutional neural network architecture provided in Table 1 is used, and the size of the image block is 27×27, and has a total of 27 rows and 27 columns of pixels; the image block is preprocessed to have an average of 0 and a variance of 1. During offline training, 2000 atone transformation matrices are randomly generated according to formula (4) for generating a distorted image. The number of second image blocks is 400, and the output vector is a class vector of 1×400 dimensions. The number of ferns in the random ferns method is 30, and the number of features in each fern is 12. As shown in Table 2, for the images provided in FIG. 3a and FIG. 3b, the accuracy of the method provided in the embodiments of this application is 86%, and the accuracy of the ferns method is 88%; for the images provided in FIG. 4a and FIG. 4b, the accuracy of the method provided in this embodiment of this application is 87%, and the accuracy of the Ferns method is 88%. Therefore, the method provided in the embodiments of this application has approximately the same accuracy as the ferns method. However, in view of the occupied memory, the method provided in the embodiments of this application uses a convolutional neural network, which occupies only 0.5557 M of memory, and the Ferns method occupies 93.75 NI of the memory. Therefore, the method provided in the embodiments of this application has significantly low memory resource consumption.

TABLE 2

Experimental Data Comparison

| Method | Images provided in FIG. 3a and FIG. 3b Accuracy (%) | Images provided in FIG. 4a and FIG. 4b Accuracy (%) | Occupied memory (M) |
|---|---|---|---|
| The embodiments of this application | 86 | 87 | 0.5557 |
| Ferns | 88 | 88 | 93.75 |

Figure 8:
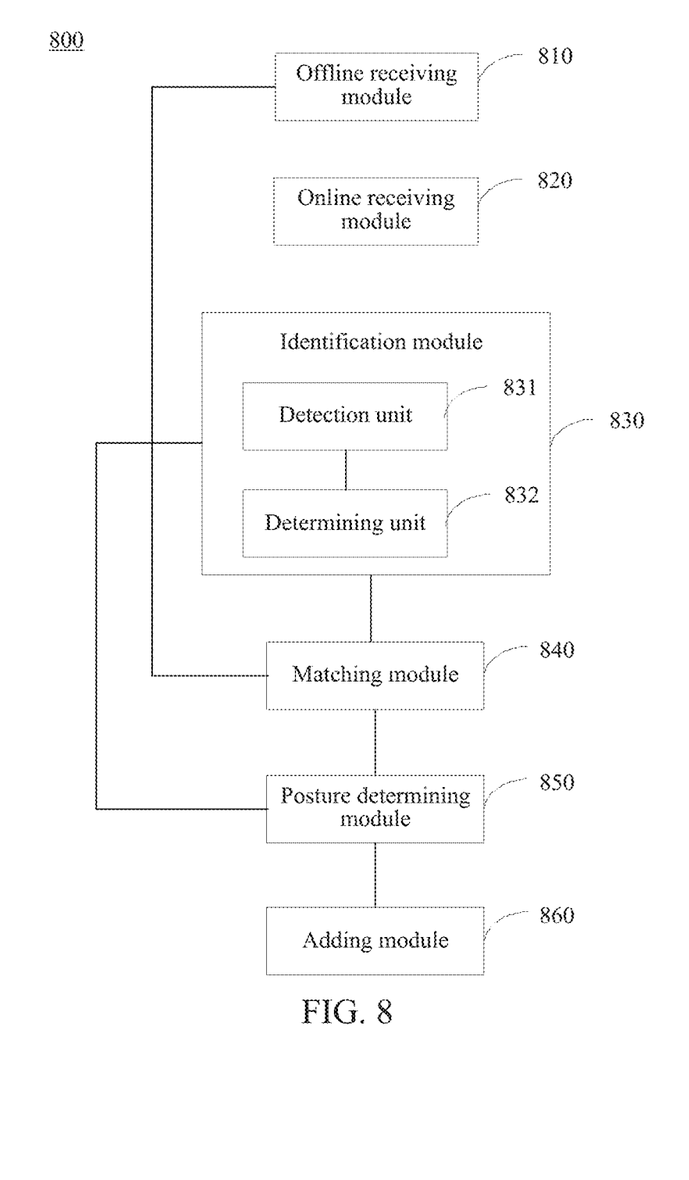
FIG. 8 is a schematic structural diagram of a client according to an embodiment of this application.

FIG. 8 is a schematic structural diagram of a client 800 according to an embodiment of this application. As shown in FIG. 8, the client 800 may be a virtual apparatus that executes the method for determining an object posture in an image in the embodiments of the present disclosure, and the apparatus includes processing circuitry that performs various functions. For example, the apparatus includes the following modules, an offline receiving module 810, configured to obtain a training model parameter of a convolutional neural network of a target object from a server;

an online receiving module 820, configured to obtain a real-time image of the target object;

an identification module 830, configured to identify at least one first image block from the real-time image;

a matching module 840, configured to determine, according to the training model parameter through the convolutional neural network, a label image block matching the at least one first image block;

a posture determining module 850, configured to determine a posture of the target object according to the at least one first image block and the label image block matching the at least one first image block; and an adding module 860, configured to add virtual content to the real-time image according to the posture. The adding module 860 may be an optional module.

In an embodiment, the identification module 830 includes:

a detection unit 831, configured to detect feature on the real-time image, to obtain a plurality of local features; and a determining unit 832, configured to determine one of the plurality of local features whose image contrast ratio is greater than a preset contrast ratio threshold and that is not of an edge of the image to be the first image block.

In an embodiment, the training model parameter includes a weight and a second image block that is identified from the standard image, and the matching module 840 is further configured to: input each first image block into the convolutional neural network, and output, based on the weight, a probability that each first image block matches each second image block; obtain the number of probabilities that correspond to each first image block and that are greater than a probability threshold; determine a first image block whose number is greater than a preset number as a target image block; and determine the posture according to the target image block and a label image block matching the target image block.

In an embodiment, the matching module 840 is further configured to: obtain a probability that the target image block matches each second image block; determine a second image block corresponding to a largest probability in the probabilities as the label image block matching the target image block; and determine the posture according to the target image block and the label image block matching the target image block.

In an embodiment, each first image block is obtained by performing affine transformation on the label image block matching each first image block by using an affine transformation matrix, and each affine transformation matrix constitutes an affine transformation matrix set; and the posture determining module 850 is further configured to determine, according to the least squares principle from the affine transformation matrix set, a matrix estimated value of the affine transformation matrix set.

In an embodiment, the posture determining module 850 further calculates the matrix estimated value by using the following formula:

$$\hat{A} = \underset{A \in G}{\operatorname{argmin}} \sum_{i=1}^{N} \|q_i - Ap_i\|, \quad (9)$$

where $\hat{A}$ is the matrix estimated value, $q_i$, is the first image block, i=1, . . . , N, N is a total number of the first image blocks, $p_i$, is the label image block matching $q_i$, A is the affine transformation matrix, $\|\bullet\|$ represents a square of a modulus value of •, and G is the affine transformation matrix set.

Figure 9:
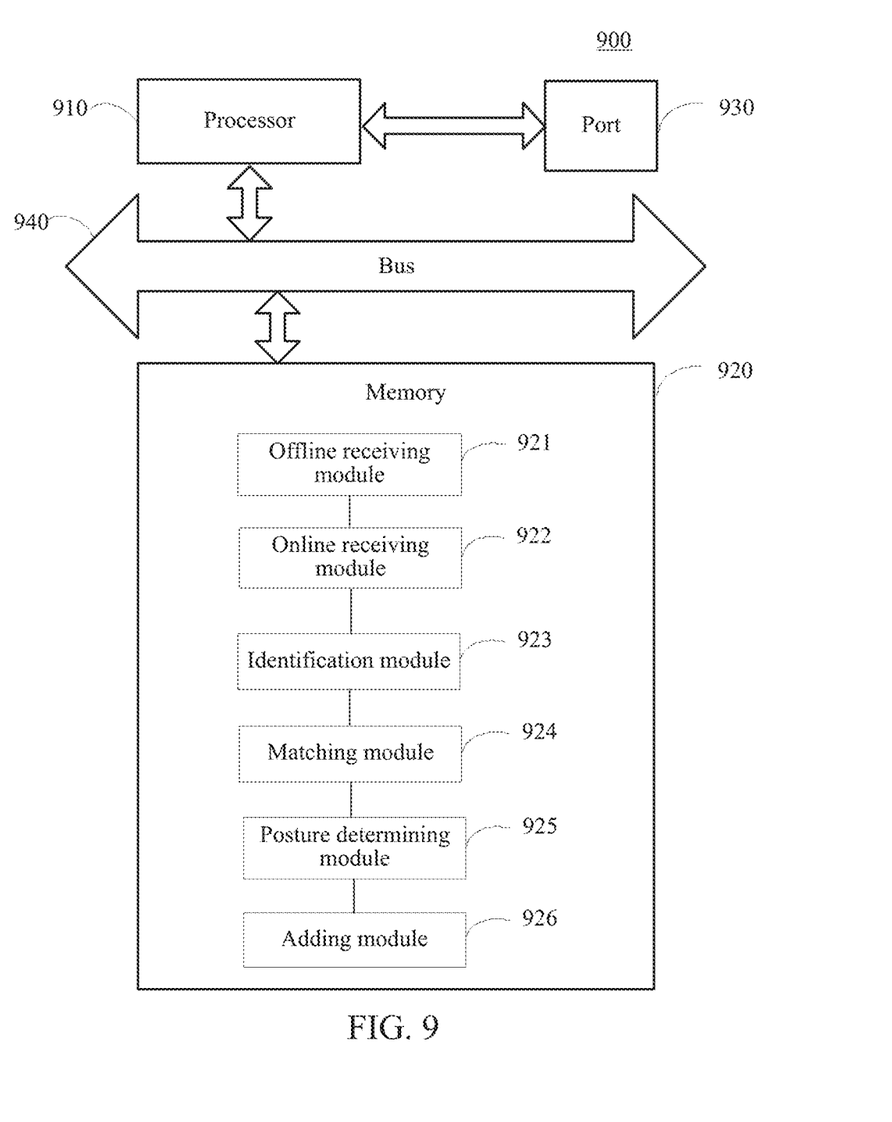
FIG. 9 is a schematic structural diagram of a client according to another embodiment of this application.

FIG. 9 is a schematic structural diagram of a client 900 in another embodiment of this application. The client 900 may be the terminal device 102 shown in FIG. 1. As shown in FIG. 9, the server 900 includes: a processor 910, a memory 920, a port 930, and a bus 940. The processor 910 and the memory 920 are interconnected by using the bus 940. The processor 910 may receive and send data by using the port 930.

The processor 910 includes processing circuitry and is configured to execute a machine readable instruction module stored in the memory 920.

The memory 920 stores the machine readable instruction module executable by the processor 910. Instruction modules executable by the processor 910 include: an offline receiving module 921, an online receiving module 922, an identification module 923, a matching module 924, a posture determining module 925, and an adding module 926.

When executed by the processor 910, the offline receiving module 921 may be configured to obtain a training model parameter of a convolutional neural network of a target object from a server.

When executed by the processor 910, the online receiving module 922 configured to obtain a real-time image of the target object.

When executed by the processor 910, the identification module 923 may be configured to identify at least one first image block from the real-time image.

When executed by the processor 910, the matching module 924 may be configured to determine, according to the training model parameter through the convolutional neural network, a label image block matching each first image block.

When executed by the processor 910, the posture determining module 925 may be configured to determine a posture of the target object according to each first image block and the label image block matching each first image block.

When executed by the processor 910, the adding module 926 may be configured to add virtual content to the real-time image according to the posture. The adding module 926 may be an optional module.

Therefore, when the instruction module stored in the memory 920 is executed by the processor 910, various functions of the offline receiving module, the online receiving module, the identification module, the matching module, the posture determining module, and the adding module in the foregoing embodiments can be implemented.

Figure 10:
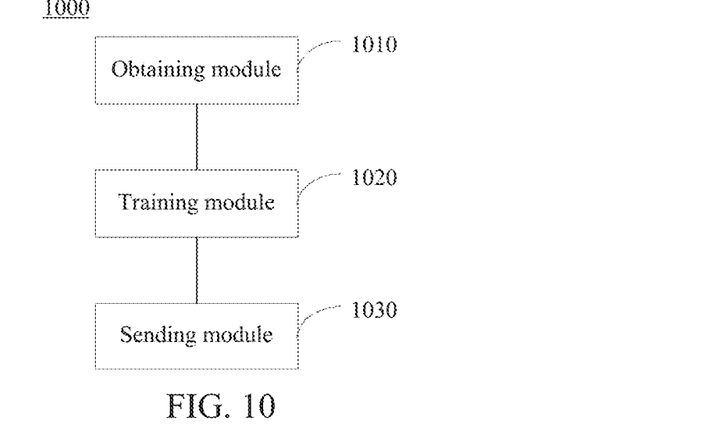
FIG. 10 is a schematic structural diagram of a server according to an embodiment of this application.

FIG. 10 is a schematic structural diagram of a server 1000 according to an embodiment of this application. As shown in FIG. 10, the server 1000 includes a virtual apparatus that executes the method for determining an object posture in an image in the embodiments of present application, and the apparatus includes:

an obtaining module 1010, configured to obtain a standard image of a target object, and a plurality of distorted images of the target object;

a training module 1020, configured to input the standard image and the plurality of distorted images into a convolutional neural network for training, to obtain a training model parameter of the convolutional neural network; and a sending module 1030, configured to: send the training model parameter to a client, so that the terminal device obtains a real-time image of the target object through the client, identify at least one first image block from the real-time image; determine, according to the training model parameter through the convolutional neural network, a label image block matching each first image block; and determine a posture of the target object according to each first image block and the label image block matching each first image block.

In an embodiment, the obtaining module 1010 is further configured to: randomly generate a plurality of affine transformation matrices; and perform affine transformation on the standard image by using each affine transformation matrix, to obtain each distorted image.

In an embodiment, the convolutional neural network includes a plurality of convolutional layers. The training module 1020 is further configured to: identify at least one second image block from a standard image; and determine the number of convolutional layers in the convolutional neutral network according to the number of second image blocks, and the preset correspondence between the number of second image blocks and the number of convolutional layers.

In an embodiment, the training module 1010 is further configured to: identify at least one second image block from the standard image; separately identify each distorted image, to obtain at least one third image block; and train to obtain the weight by using the third image block as an input sample and using the second image block as an ideal output sample during training of the convolutional neural network.

Figure 11:
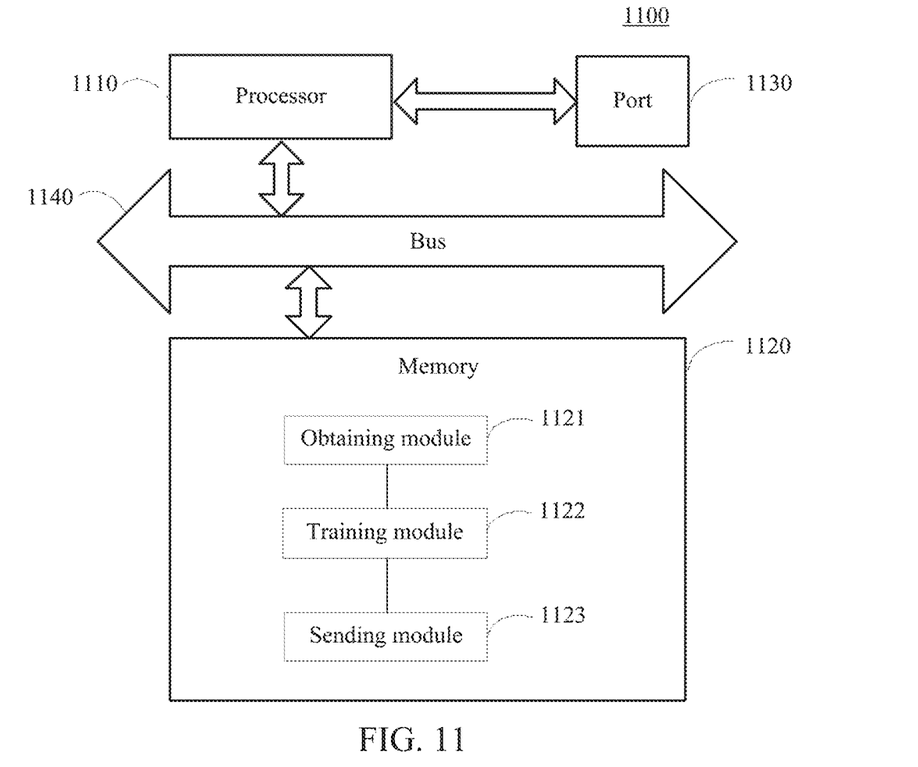
FIG. 11 is a schematic structural diagram of a server according to another embodiment of this application.

FIG. 11 is a schematic structural diagram of a server 1100 according to another embodiment of this application. As shown in FIG. 11, the server 1100 includes: a processor 1110, a memory 1120, a port 1130, and a bus 1140. The processor 1110 and the memory 1120 are interconnected by using the bus 1140. The processor 1110 may receive and send data by using the port 1130.

The processor 1110 includes processing circuitry and is configured to execute a machine readable instruction module stored in the memory 1120.

The memory 1120 stores the machine readable instruction module executable by the processor 1110. Instruction modules executable by the processor 1110 include: an obtaining module 1121, a training module 1122, and a sending module 1123.

When executed by the processor 1110, the obtaining module 1121 may be configured to: obtain a standard image and a plurality of distorted images of a target object.

When executed by the processor 1110, the training module 1122 may be configured to input the standard image and the plurality of distorted images into a convolutional neural network for training, to obtain a training model parameter.

When executed by the processor 1110, the sending module 1123 may be configured to: send the training model parameter to a client, so that the terminal device obtains a real-time image of the target object through the client, identify at least one first image block from the real-time image; determine, according to the training model parameter through the convolutional neural network, a label image block matching each first image block; and determine a posture of the target object according to each first image block and the label image block matching each first image block.

Therefore, when the instruction module stored in the memory 1120 is executed by the processor 1110, various functions of the obtaining module, the training module, and the sending module in the foregoing embodiments may be implemented.

In the foregoing apparatus embodiment, exemplary methods in which the modules and units implement functions of themselves are described in the forgoing embodiments, and details are not described herein again.

In addition, functional modules in the embodiments of in this application may be integrated into one processing unit, or each of the modules may exist alone physically, or two or more modules are integrated into one unit. The integrated units may be implemented in a form of hardware or may be implemented in a form of a software functional unit.

In addition, each embodiment of this application may be implemented by a data processing program executed by a data processing device such as a computer. The data processing program constitutes this application. In addition, generally, a data processing program stored in a non-transitory storage medium is directly read from the non-transitory storage medium for execution or the program is installed on or replicated to a storage device (such as a hard disk or memory) of the data processing device for execution. Therefore, such a non-transitory storage medium also constitutes this application. The non-transitory storage medium may use any type of recording manner, such as a paper storage medium (such as a paper tape), a magnetic storage medium (such as a floppy disk, a hard disk, or a flash memory), an optical storage medium (such as a CD-ROM), or a magneto-optical storage medium (such as an MO).

Therefore, this application further provides anon-transitory storage medium storing at least one data processing program. The data processing program is used for executing any embodiment of the foregoing method of this application. In an example, the storage medium stores at least one instruction, a code set, or an instruction set, and the at least one instruction, the code set, or the instruction set being loaded and executed by the processor to implement any embodiment of the foregoing method of this application.

A person of ordinary skill in the art may understand that all or some of the steps of the foregoing embodiments may be implemented by using hardware, or may be implemented by a program instructing relevant hardware. The program may be stored in a non-transitory computer readable storage medium. The non-transitory storage medium may be a ROM, a magnetic disk, an optical disc, or the like.

The foregoing descriptions are merely exemplary embodiments of this application, and are not intended to limit this application. Any modification, equivalent replacement, or improvement made within the spirit and principle of this application shall fall within the protection scope of this application.

What is claimed is:

1. A method for determining a posture of a target object in an image, comprising:
   obtaining a training model parameter of a convolutional neural network of the target object from a server;
   obtaining a real-time image of the target object;
   identifying at least one first image block from the real-time image, the at least one first image block being a local image of the real-time image;
   determining, according to the training model parameter, a label image block matching the at least one first image block, the label image block being a local image of a standard image of the target object; and
   determining, by processing circuitry, the posture of the target object according to the at least one first image block and the determined label image block,
   wherein the identifying comprises:
   detecting a plurality of local features on the real-time image, and
   determining one of the plurality of local features that is determined not to be at an edge of the real-time image to be a first image block of the at least one first image block.

2. The method according to claim 1, wherein the determining the one of the plurality of local features comprises:
   determining the one of the plurality of local features to be the first image block based on a determination that (i) an image contrast ratio of the one of the plurality of local features is greater than a preset contrast ratio threshold and the determination that (ii) the one of the plurality of local features is not at the edge of the real-time image.

3. The method according to claim 1, wherein the training model parameter includes a weight and a plurality of second image blocks that is identified from the standard image, each of the plurality of second image blocks being a local image of the standard image, and the determining the posture comprises:
   inputting the at least one first image block into the convolutional neural network, and outputting, based on the weight, a plurality of probabilities that the at least one first image block matches each of the plurality of second image blocks;
   determining a number of probabilities of the plurality of probabilities that are greater than a probability threshold;
   determining the at least one first image block to be a target image block based on a determination that the number of probabilities exceeds a preset number; and
   determining the posture of the target object according to the target image block and the label image block.

4. The method according to claim 3, wherein the determining the posture further comprises:
   determining one of the plurality of second image blocks corresponding to a largest probability of the plurality of probabilities to be the label image block; and
   determining the posture according to the target image block and the label image block.

5. The method according to claim 1, wherein
   the at least one first image block is obtained by performing an affine transformation on the label image block using an affine transformation matrix, and the affine transformation matrix constitutes an affine transformation matrix set, and
   the determining the posture comprises:
   determining, according to a least squares principle from the affine transformation matrix set, a matrix estimated value of the affine transformation matrix set, the matrix estimated value being an argument of inverse transformation corresponding to the affine transformation matrix.

6. The method according to claim 5, wherein the matrix estimated value is determined using the following formula:

$$\hat{A} = \underset{A \in G}{\operatorname{argmin}} \sum_{i=1}^{N} \|q_i - Ap_i\|,$$

wherein $\hat{A}$ is the matrix estimated value, $q_i$ is the at least one first image block, $i=1, \ldots, N$, N is a total number of the at least one first image block, $p_i$ is the label image block matching $q_i$, A is the affine transformation matrix, $\|\cdot\|$ represents a square of a modulus value of •, and G is the affine transformation matrix set.

7. The method according to claim 1, further comprising:
   overlaying virtual content to the real-time image according to the posture; and
   displaying the virtual content with the real-time image.

8. A method for determining a posture of a target object in an image, comprising:
   obtaining a standard image of the target object, and a plurality of distorted images of the target object;
   inputting the standard image and the plurality of distorted images into a convolutional neural network for training to obtain a training model parameter of the convolutional neural network; and sending, by processing circuitry, the training model parameter to a terminal device, wherein the training model parameter is configured to cause the terminal device to:

obtain a real-time image of the target object, identify at least one first image block from the real-time image, the first image block being a local image of the real-time image, determine, according to the training model parameter, a label image block matching the at least one first image block, the label image block being a local image of the standard image of the target object, and determine the posture of the target object according to the at least one first image block and the label image block, wherein in the identification of the at least one first image block, (i) a plurality of local features on the real-time image are detected, and (ii) one of the plurality of local features that is determined not to be at an edge of the real-time image is determined to be a first image block of the at least one first image block.

9. The method according to claim 8, wherein the obtaining the plurality of distorted images comprises:

randomly generating a plurality of affine transformation matrices; and performing an affine transformation on the standard image by using each of the plurality of affine transformation matrices to obtain each of the plurality of distorted images.

10. The method according to claim 8, wherein the convolutional neural network includes a plurality of convolutional layers, and the method further comprises:

identifying at least one second image block from the standard image, the at least one second image block being a local image of the standard image; and determining a number of the plurality of convolutional layers in the convolutional neural network according to a number of the at least one second image block and a preset correspondence between the number of the at least one second image block and the number of plurality of convolutional layers.

11. The method according to claim 8, wherein the inputting comprises:

identifying at least one second image block from the standard image, the at least one second image block being a local image of the standard image;

identifying at least one third image block from the plurality of distorted images, the at least one third image block being a local image of one of the plurality of distorted images; and obtaining a weight by using the at least one third image block as an input sample and using the at least one second image block as an ideal output sample during training of the convolutional neural network.

12. An apparatus for determining a posture of a target object in an image, comprising:

processing circuitry configured to obtain a training model parameter of a convolutional neural network of the target object from a server, obtain a real-time image of the target object, identify at least one first image block from the real-time image, the first image block being a local image of the real-time image, determine, according to the training model parameter, a label image block matching the at least one first image block, the label image block being a local image of a standard image of the target object, and determine the posture of the target object according to at least one first image block and the determined label image block, wherein the processing circuitry is further configured to detect a plurality of local features on the real-time image, and determine one of the plurality of local features that is determined not to be at an edge of the real-time image to be a first image block of the at least one first image block.

13. The apparatus according to claim 12, wherein the processing circuitry is further configured to determine the one of the plurality of local features to be the first image block based on a determination that (i) an image contrast ratio of the one of the plurality of local features is greater than a preset contrast ratio threshold and the determination that (ii) the one of the plurality of local features is not at the edge of the real-time image.

14. The apparatus according to claim 12, wherein the training model parameter includes a weight and a plurality of second image blocks that is identified from the standard image, each of the plurality of second image blocks being a local image of the standard image, and the processing circuitry is further configured to input the at least one first image block into the convolutional neural network, and outputting, based on the weight, a plurality of probabilities that the at least one first image block matches each of the plurality of second image blocks, determine a number of probabilities of the plurality of probabilities that are greater than a probability threshold, determine the at least one first image block to be a target image block based on a determination that the number of probabilities exceeds a preset number, and determine the posture of the target object according to the target image block and the label image block.

15. The apparatus according to claim 14, wherein the processing circuitry is further configured to determine one of the plurality of second image blocks corresponding to a largest probability of the plurality of probabilities to be the label image block, and determine the posture according to the target image block and the label image block.

16. The apparatus according to claim 12, wherein the at least one first image block is obtained by performing an affine transformation on the label image block using an affine transformation matrix, and the affine transformation matrix constitutes an affine transformation matrix set, and the processing circuitry is further configured to determine, according to a least squares principle from the affine transformation matrix set, a matrix estimated value of the affine transformation matrix set, the matrix estimated value being an argument of inverse transformation corresponding to the affine transformation matrix.

17. The apparatus according to claim 16, wherein the matrix estimated value is determined using the following formula:

$$\hat{A} = \operatorname*{argmin}_{A \in G} \sum_{i=1}^{N} \|q_i - Ap_i\|,$$

wherein $\hat{A}$ is the matrix estimated value, $q_i$ is the at least one first image block, i=1, ..., N, N is a total number of the at least one first image blocks, $p_i$ is the label image block matching $q_i$, A is the affine transformation matrix, $\|\cdot\|$ represents a square of a modulus value of •, and G is the affine transformation matrix set.

18. The apparatus according to claim 12, where the processing circuitry is further configured to
overlay virtual content to the real-time image according to the posture, and
display the virtual content with the real-time image.

19. An apparatus for determining a posture of a target object in an image, comprising:
processing circuitry configured to
obtain a standard image of the target object, and a plurality of distorted images of the target object,
input the standard image and the plurality of distorted images into a convolutional neural network for training to obtain a training model parameter of the convolutional neural network, and
send the training model parameter to a terminal device, wherein the training model parameter is configured to cause the terminal device to
obtain a real-time image of the target object,
identify at least one first image block from the real-time image, the first image block being a local image of the real-time image,
determine, according to the training model parameter, a label image block matching the at least one first image block, the label image block being a local image of the standard image of the target object, and
determine the posture of the target object according to the at least one first image block and the label image block,
wherein in the identification of the at least one first image block, (i) a plurality of local features on the real-time image are detected, and (ii) one of the plurality of local features that is determined not to be at an edge of the real-time image is determined to be a first image block of the at least one first image block.

20. The apparatus according to claim 19, wherein the processing circuitry is further configured to
randomly generate a plurality of affine transformation matrices, and
perform an affine transformation on the standard image by using each of the plurality of affine transformation matrices to obtain each of the plurality of distorted images.

21. The apparatus according to claim 19, wherein the convolutional neural network comprises a plurality of convolutional layers, and the processing circuitry is further configured to
identify at least one second image block from the standard image, the at least one second image block being a local image of the standard image, and
determine a number of the plurality of convolutional layers in the convolutional neural network according to a number of the at least one second image block and a preset correspondence between the number of the at least one second image block and the number of plurality of convolutional layers.

22. The apparatus according to claim 19, wherein the processing circuitry is further configured to
identify at least one second image block from the standard image, the at least one second image block being a local image of the standard image,
identify at least one third image block from the plurality of distorted images, the at least one third image block being a local image of one of the plurality of distorted images, and
obtain a weight by using the at least one third image block as an input sample and using the at least one second image block as an ideal output sample during training of the convolutional neural network.

23. A non-transitory computer-readable storage medium, storing a program executable by a processor to perform the method for determining the posture of the target object in the image according to claim 1.

* * * * *